Patented Nov. 23, 1948

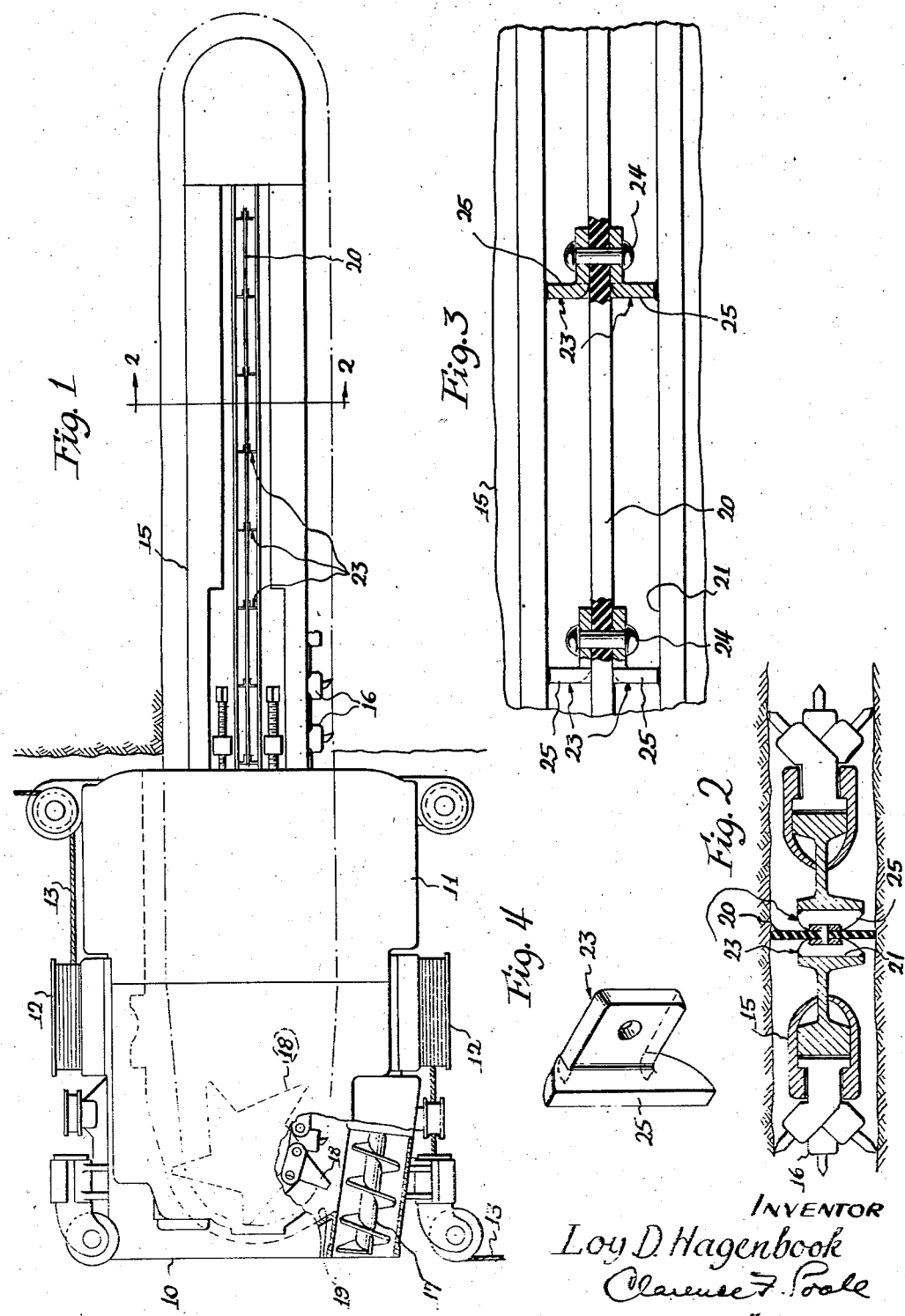

2,454,446

UNITED STATES PATENT OFFICE 2,454,446

KERF-CUTTING MACHINE

Loy D. Hagenbook, Chicago, Ill., assignor to Goodman Manufacturing Company, Chicago, Ill., a corporation of Illinois Application January 9, 1947, Serial No. 721,086

6 Claims. (Cl. 262—30)

This invention relates to improvements in kerf-cutting machines and more particularly relates to a novel form of sweeping device for clearing the cuttings from the kerf during the cutting operation so they may more readily be picked up by the cutter chain of the machine and directed to a conveying means for mechanically conveying the cuttings away from the machine.

Heretofore cuttings clearing or conveying devices have been quite extensively used to take the place of hand shoveling to discharge the cuttings or bug dust carried from the kerf by the cutter chain, away from the machine out of the path of the cutter chain so they will not be carried back into the kerf by the chain. These cuttings conveying devices have operated very satisfactorily, but where they have been used, about an inch and a half or two inches of fine cuttings or bug dust is usually left in the kerf after the cutting operation, which cannot be cleaned up except by hand with a long handled scoop inserted in the kerf. These cuttings are not picked up because they slip under the cutter chain and cutter bar as it feeds across the working face, and oftentimes make it necessary to scoop the cuttings left in the kerf by hand, so the coal will properly be broken down for loading.

The principal object of my present invention is to remedy these difficulties by providing a novel efficient and simple means for sweeping the bug dust which slips beneath the cutter chain with the cutter bar along the kerf as the cutter bar advances across the coal face, so substantially all of the cuttings may be cleared from the kerf and picked up by the cutter chain and carried back for discharge beyond the machine.

A more specific object of my invention is to provide a novel and efficient flexible sweep secured to the cutter bar of a kerf-cutting machine between the ingoing and outgoing runs of the cutter chain, and arranged to engage the top and bottom of the kerf and move a greater part of the cuttings with the cutter bar as the cutting operation progresses, to assure that substantially all of the cuttings be carried back beneath the machine for discharge out of the path of the cutter chain.

These and other objects of my invention will appear from time to time as the following specification proceeds and with reference to the accompanying drawings wherein:

Figure 1 is a plan view of a kerf-cutting machine having a flexible sweeping device incorporated in the cutter bar in accordance with my invention, and with certain parts of the machine broken away and certain other parts shown in horizontal section in order to show the cuttings conveying device associated with the machine;

Figure 2 is a fragmentary transverse sectional view taken substantially along line 2—2 of Figure 1;

Figure 3 is an enlarged detail fragmentary plan view of the cutter bar having a cuttings sweep carried thereby in accordance with my invention, with certain parts of the sweeping device and the fastening means for securing said sweeping device to the cutter bar shown in substantially horizontal section; and Figure 4 is a detail isometric view showing in detail one of the fastening members for the sweeping device.

In the embodiment of my invention illustrated in the drawings, a kerf-cutting machine of a well known form of room and pillar type is shown as including a main frame 10 having a motor 11 secured to and projecting forwardly of its forward end. A flexible feeding means may be provided at opposite sides of said main frame rearwardly of said motor, which may comprise a pair of winding drums 12, 12 adapted to have flexible cables 13, 13 wound thereon and arranged to be anchored at their free ends at suitable points adjacent the working face, for feeding the kerf-cutting machine into and across the working face of a mine, as usual.

A cutter bar 15 having a cutter chain 16 guided for movement thereabout projects forwardly from the motor 11 and may be mounted on the underside of said motor. Said cutter bar and cutter chain may extend beneath said motor and may be driven from the rear end thereof so as to propel the cuttings beneath said motor and main frame and discharge them from the rear end of the machine.

As herein shown, a cuttings clearing or conveying device 17 of a screw conveyor type is provided at the rear retreating side of the machine for receiving the cuttings propelled therein by the cutter chain and for conveying them beyond the rear end of the machine so they will not have to be taken away from the path of the cutter chain by hand shoveling. A rotary sweep 18 is shown as being mounted coaxial with the shaft which drives the cutter chain 16 about the cutter bar 15, and aids the cutter chain in propelling the cuttings along an arcuate deflector 19, closing the rear end of the machine, into the cuttings clearing device 17. Said cuttings clearing device and sweep are clearly shown and described in application Serial No. 602,565, Patent No. 2,429,323, filed by Frank Lindgren June 30, 1945, and entitled Kerf-cutting machine, and are no part of my present invention so need not herein be shown or described further.

Referring now to the device for sweeping the kerf as the cutter bar 15 advances across the coal face and for moving the cuttings which may slip under the cutter chain with the cutter bar while cutting, a flexible sweep 20 engageable with the top and bottom of the kerf extends along the central portion of said cutter bar. Said cutter bar is herein shown as being of a well known form of built up cutter bar and has a central opening or slot 21 extending therealong, which forms a means for receiving said sweep. Said sweep may be in the form of a piece of rubber belting or any other suitable relatively stiff flexible material, and is mounted in said slot and extends sufficient distances above and below said cutter bar to engage and efficiently sweep the top and bottom of the kerf and move the cuttings slipping past the cutter chain, with said cutter bar. A plurality of longitudinally spaced angle clips 23, 23 are provided to secure said sweep to the slotted portion of said cutter bar. Said clips are secured to opposite sides of said sweep as by rivets 24, 24 and each has vertical legs 25, 25 extending laterally in opposite directions from said sweep. Said legs 25, 25 abut the facing inner faces of the slot 21 at their outer edges, and are adapted to be secured to said inner faces of said slot in any suitable manner. Said legs are herein shown as being welded to said inner faces of said slot.

The sweep 20 extending along the slot 21 for substantially the full length of the cutter bar and extending above and below said cutter bar so as to engage the top and bottom of the kerf with a sweeping action, will thus sweep the cuttings which slip beneath the cutter chain with the cutter bar, while said cutter bar is advancing across the coal face during cutting, so substantially all of the cuttings will be conveyed rearwardly by the cutter chain to the cuttings clearing device 17, for discharge beyond the rear end of the machine out of the path of said cutter chain.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a mining machine and in combination with a cuttings clearing device therefor, kerf-cutting mechanism for cutting a kerf in a mine wall including a projecting cutter bar having a cutter chain movable thereabout, and means secured to and extending along said cutter bar and yieldably engaging the bottom of the kerf, for sweeping the kerf and moving the cuttings with said cutter bar during cutting, to assure that said cutter chain will expel substantially all of the cuttings from the kerf during cutting and carry them for discharge to said cuttings clearing device and out of the path of said cutter chain.

2. In a mining machine and in combination with a cuttings clearing device therefor, kerf-cutting mechanism for cutting a kerf in a mine wall including a projecting cutter bar having a cutter chain movable thereabout, and means secured to and extending along said cutter bar and spaced from the outgoing run of the cutter chain and yieldably engaging the bottom of the kerf for substantially the full length of the cutter bar, for sweeping the kerf and moving the cuttings with said cutter bar during cutting, to assure that said cutter chain will expel substantially all of the cuttings from the kerf during cutting and carry them for discharge to said cuttings clearing device and out of the path of said cutter chain.

3. In a mining machine and in combination with a cuttings clearing device therefor, kerf-cutting mechanism for cutting a kerf in a mine wall including a projecting cutter bar having a cutter chain movable thereabout, and a flexible sweeping member secured to said cutter bar and extending therealong between the ingoing and outgoing runs of the cutter chain and having sweeping engagement with the bottom of the kerf to move the cuttings slipping beneath said cutter chain with said cutter bar during cutting, and to assure that the cutter chain expel substantially all of the cuttings from the kerf during the cutting operation, for discharge to said cuttings clearing device and out of the path of said cutter chain.

4. In a mining machine and in combination with a cuttings clearing device therefor, kerf-cutting mechanism for cutting a kerf in a mine wall including a projecting cutter bar having a cutter chain movable thereabout, and a flexible sweeping member secured to said cutter bar between the ingoing and outgoing runs of the cutter chain and extending above and below the upper and lower margins of said cutter bar so as to have sweeping engagement with the top and bottom of the kerf during the cutting operation, to sweep said kerf and to cause the cuttings passing beneath the cutter chain to move with said cutter bar and to assure that the cutter chain expel substantially all of the cuttings during the cutting operation and carry them out of the kerf to said cuttings clearing device for discharge out of the path of said cutter chain.

5. In a mining machine and in combination with a cuttings clearing device therefor, kerf-cutting mechanism for cutting a kerf in a mine wall including a projecting cutter bar having a cutter chain movable thereabout, said cutter bar having a longitudinally slotted central portion extending for a substantial portion of its length, and a flexible sweeping member mounted in said slotted portion of said cutter bar and extending for substantially the full length thereof and having yieldable engagement with the bottom of the kerf for sweeping the kerf during cutting, to assure that said cutter chain expel substantially all of the cuttings from the kerf during cutting and carry them for discharge to said cuttings clearing device and out of the path of said cutter chain.

6. In a mining machine and in combination with a cuttings clearing device therefor, kerf-cutting mechanism for cutting a kerf in a mine wall including a projecting cutter bar having a cutter chain movable thereabout, said cutter bar having a longitudinally slotted central portion extending for a substantial portion of its length, and a flexible sweeping member mounted in said slotted portion of said cutter bar and extending above and below said cutter bar for substantially the full length of the slotted portion thereof and having yieldable engagement with the top and bottom of the kerf, for sweeping the kerf during the cutting operation to assure that said cutter chain expel substantially all of the cuttings from the kerf during cutting and carrying them for discharge to said cuttings clearing device and out of the path of said cutter chain.

LOY D. HAGENBOOK.

No references cited.